United States Patent [19]

Holladay

[11] Patent Number: 5,733,590

[45] Date of Patent: Mar. 31, 1998

[54] SLOW RELEASE NON-PROTEIN NITROGEN SOURCE FOR RUMINANT FEED AND PROCESS OF MAKING

[76] Inventor: Wayland Holladay, R.R. 02, Box 223, La Mesa, Tex. 79331

[21] Appl. No.: 749,739

[22] Filed: Nov. 15, 1996

Related U.S. Application Data

[60] Provisional application No. 60/006,925 Nov. 17, 1995.
[51] Int. Cl.$^6$ .................................................... A23K 1/22
[52] U.S. Cl. ................................... 426/69; 426/2; 426/807
[58] Field of Search .................................. 426/69, 807, 2

[56] References Cited

U.S. PATENT DOCUMENTS

| | | |
|---|---|---|
| Re. 32,477 | 8/1987 | McConnell . |
| 3,185,648 | 5/1965 | Standish et al. . |
| 3,523,798 | 8/1970 | Kail . |
| 3,962,484 | 6/1976 | Grosso et al. .......................... 426/807 |
| 4,094,805 | 6/1978 | Hansen . |
| 4,431,558 | 2/1984 | Wada et al. . |
| 4,500,335 | 2/1985 | Fenn . |
| 4,597,884 | 7/1986 | Greenwald . |
| 4,668,416 | 5/1987 | Neal . |
| 4,676,918 | 6/1987 | Toth et al. . |
| 4,698,173 | 10/1987 | Hansen . |
| 4,778,615 | 10/1988 | Jeglic . |
| 4,798,727 | 1/1989 | Miller ..................................... 426/807 |
| 4,960,531 | 10/1990 | Connor et al. . |
| 5,562,916 | 10/1996 | Vanooijen ............................... 426/807 |

OTHER PUBLICATIONS

"Studies Of The Adaptation Phenomenon By Lambs Fed Urea As The Sole Nitrogen Source: Digestibility And Nutrient Balance", R.L. Ludwick, J.P. Fontenot, R.E. Tucker, Journal of Animal Science, vol. 33, 1971.

"Problems iN Feed Urea To Ruminants", William Chalupa, Clemson University, Clemson, South Carolina, pp. 207–219.

"Slow Ammonia Release From Urea: Rumen And Metabolism Studies", F.N. Owens, K.S. Lusby, K. Mizwicki, O. Forero, Journal of Animal Science, vol. 50, No. 3, 1980.

"Biuret Versus Urea and Cottonseek Metal For Wintering And Finishing Steers", R.R. Oltjen, W.C. Burns, C.B. Ammerman, Journal of Animal Science, vol. 38, No. 5, 1974.

"The Influence of Different Amounts And Sources of Energy Upon In Vitro Urea Utilization By Rumen Microorganisms", C.Arias, W. Burroughs, P. Gerlaugh, R.M. Bethke, Ohio Agricultural Experiment Station.

"Urea Toxicity Studies In The Bovine", J.D. Word, L.C. Martin, D.L. Williams, E.I. Williams, R.J. Panciera, T.E. Nelson, A.D. Tillman, Oklahoma Agricultural Experiment Station, Stillwater, pp. 786–791.

"Kinetics of Urea Metabolism In Sheep", R.A. Bloomfield, G.B. Garner, M.E. Muhrer, University of Missouri, Columbia.

"Effect of Rate of Release of Urea On Its Utilization By Sheep", J.E. Huston, M. Shelton, L.H. Breuer, Journal of Animal Science, vol. 39, No. 3, 1974, pp. 618–628.

"In Vitro And in Vivo Ammonia Release From Slow–Release", Urea Supplements, J.R. Males, R.A. Munsinger, R.R. Johnson, Journal of Animal Science, vol. 48, No. 4, 1979.

"Soybean Meal, Urea And Extruded Starch–Urea Products Compared As Protein Supplments In High–Roughabe Lamb Rations", S.A. Shiehzadeh, L.H. Harbers, Journal of Animal Science, vol. 38, No. 1, 1974.

(List continued on next page.)

Primary Examiner—Helen Pratt

[57] ABSTRACT

A slow ammonia release non-protein feed supplement that enables the use of higher level of a non-protein nitrogen source in ruminant feed is disclosed along with the process for making the same. In a preferred embodiment, a 38 wt. % calcium chloride solution is mixed with dry urea to produce a feed supplement having a ratio of nitrogen to calcium of from about 2.5:1 to about 4:1 and a salt out temperature between from about –40° F. to –70° F.

13 Claims, 8 Drawing Sheets

OTHER PUBLICATIONS

"Effect of Rats of Release of Urea On Its Utilization By Sheep", J.E. Huston, M. Shelton, L.H. Breuer, Journal of Animal Science, vol. 39, No. 3, 1974.

"Feed Processing. VI. Comparison of Starea, Urea, and Soybean Meal As Protein Sources for Lactating Diary Cows", L.G. Helmer, E.E. Bartley, C.W. Deyoe, Journal of Diary Science, vol. 53, No. 7, pp. 883–887.

"Urea And Other Nonprotein Nitrogen Compounds In Animal Nutrition", National Academy of Sciences, Washington, D.C., 1976.

5,733,590

SLOW RELEASE NON-PROTEIN NITROGEN SOURCE FOR RUMINANT FEED AND PROCESS OF MAKING

RELATED APPLICATION

This application claims priority from U.S. Provisional application Ser. No. 60/006,925, filed Nov. 17, 1995, the specification of which is incorporated herein for all purposes.

TECHNICAL FIELD

The present invention relates to a ruminant feed supplement, and in particular to a feed supplement that contains a slow release non-protein source of nitrogen.

BACKGROUND OF THE INVENTION

Feed for ruminants normally include protein, roughage, and carbohydrates. Carbohydrates (normally grain) provide calories; various sources of roughage include hay, pasture, silage, ground cotton burrs. Protein is often supplied by cottonseed meal, in addition to protein found in grain or hay, and typically the feed also contains vitamins, minerals and other supplements.

Beef cattle and other ruminants foster a population of microorganisms in the forepart of their digestive tract that allows these animals to digest ligno-cellulose materials that are at best poorly digested by non-ruminants. The digestive system of ruminants also allows these animals to utilize non-protein sources of nitrogen to synthesize protein. In ruminants, these non-protein nitrogen sources are hydrolyzed to ammonia in the rumen solution and the ammonia is eventually converted to protein through the action of microbial enzymes. Other microbial convert available carbohydrates into fatty acids and keto acids. Ammonia and keto acids are then converted to amino acids which are ultimately converted to microbial protein. Microbial protein is carried into the small intestines of the ruminant where it is broken down into free amino acids which are utilized by the ruminant to form body tissue. Although non-protein nitrogen is, of course, not protein it is referred to in the art as a protein source since it is eventually converted to protein and may be referred to herein as such.

Normally, protein sources represent a substantial portion of the cost of feed for ruminants such as beef cattle. Thus, the use of less expensive non-protein nitrogen sources is desirable to the extent that such sources can be used as a feed supplement. One such non-protein nitrogen source that has been used is urea. "Urea" as the term is used herein refers to commercial grade urea (46% urea).

One major problem with the use of urea as a non-protein source of nitrogen is ammonia toxicity. When urea is broken down into ammonia in the rumen, the ammonia may be absorbed into the blood stream of the ruminant. The liver will convert the ammonia into urea which may be excreted or reabsorbed into the stomach contents. However, if the rate of ammonia absorption exceeds the capacity of the liver to convert it to urea, ammonia will accumulate in the animal's blood possibly resulting in ammonia toxicity. Symptoms of ammonia toxicity include tremors, respiratory difficulties and spasms and the animal may ultimately die. Ammonia toxicity normally occurs within a relatively short time after the ruminant consumes feed; consequently, the rate of ammonia release in the rumen during the first several hours after the consumption of feed containing a non-protein nitrogen source, e.g., urea, is an important factor. In order to avoid the possibility of ammonia toxicity while using urea as a non-protein source of nitrogen in ruminant feed, the use of urea as a feed supplement has been limited to 1% of the total dry weight of the feed.

Another problem encountered with the use of urea in liquid feed supplements is the tendency for solids to precipitate out of the solution as the temperature decreases. This is especially problematical in the shipment and utilization of liquid feed supplements in the winter months. In the past, the use of liquid feed supplements containing urea has often required the use of special equipment, e.g., heated and insulated tanks, lines, pumps and similar equipment. Thus, there exists a need for a feed supplement that allows for the use of a higher proportion of non-protein nitrogen in ruminant feed without the risk of ammonia toxicity and that can be handled at low temperatures without special equipment.

Kail, U.S. Pat. No. 3,523,798, discloses a component of a liquid feed supplement produced by mixing dry calcium chloride with water and urea to produce an aqueous solution containing 23% nitrogen and 4.5% calcium. The Kail material, does not, however, provide the inherent advantages of the feed supplement of the present invention.

SUMMARY OF THE INVENTION

The present invention provides a slow release non-protein feed supplement that enables the use of higher level of a non-protein nitrogen source in ruminant feed than has heretofore been used. The feed supplement of the present invention is formulated to provide for substantially slower release of ammonia from a non-protein nitrogen source, e.g., urea, during anaerobic digestion, thus allowing the use of higher levels of non-protein nitrogen sources in ruminant while avoiding the risk of ammonia toxicity. As used herein, the terminology "slow release" means that the non-protein feed supplement releases ammonia at an average rate of less than 40% of the average rate that urea releases ammonia during the first six hours of in vitro testing as set forth herein. In the preferred embodiment, the feed supplement of the present invention has an ammonia release rate that is no greater than 60% of the ammonia release rate of feed grade urea at any time during the first six hours of in vitro fermentation as hereinafter described.

In one embodiment of the invention, a 38 wt. % calcium chloride solution is mixed with dry urea to produce a feed supplement having a ratio of nitrogen to calcium of from about 2.5:1 to about 4:1. More preferably, the feed supplement has a nitrogen:calcium ratio of from about 3:1 to about 3.5:1. Most preferably, the feed supplement has a nitrogen-:calcium ratio of approximately 3.3:1 (23-0-0-7 N, P, K, and Ca, respectively). As used herein, the terms "about" and "approximately" are meant to encompass a range of values representing the normal variability of commercially available constituents such as feed grade urea and commercially available calcium chloride solution.

The feed supplement of the present invention is also characterized by a salt-out temperature (the temperature at which precipitates begin to form or at which the solution gels) of from about −40° F. to −70° F. More preferably, the feed supplement of the present invention will have a salt-out temperature of from −50° F. to −70° F. Most preferably, the feed supplement has a salt-out temperature of between about −60° F. and −70° F.

The feed supplement of the present invention may be used as a liquid supplement for use in lick feeders, a component of a dry feed or in the formulation of solid supplement blocks for grazing ruminants.

The feed supplement of the present invention is formulated for slow release of ammonia from a non-protein nitrogen source by: (1) heating an aqueous solution of calcium to a temperature of between about 70° F. and about 100° F.; (2) dissolving solid feed grade urea in the aqueous calcium chloride solution; and (3) heating and agitating the mixture by direct injection of a heated gas or steam until the temperature of the solution reaches between about 45° F. and about 50° F.

BRIEF DESCRIPTION OF THE DRAWINGS

The disclosed inventions will be described with reference to the accompanying drawings, wherein.

DETAILED DESCRIPTION OF THE DRAWINGS

Figure 1:
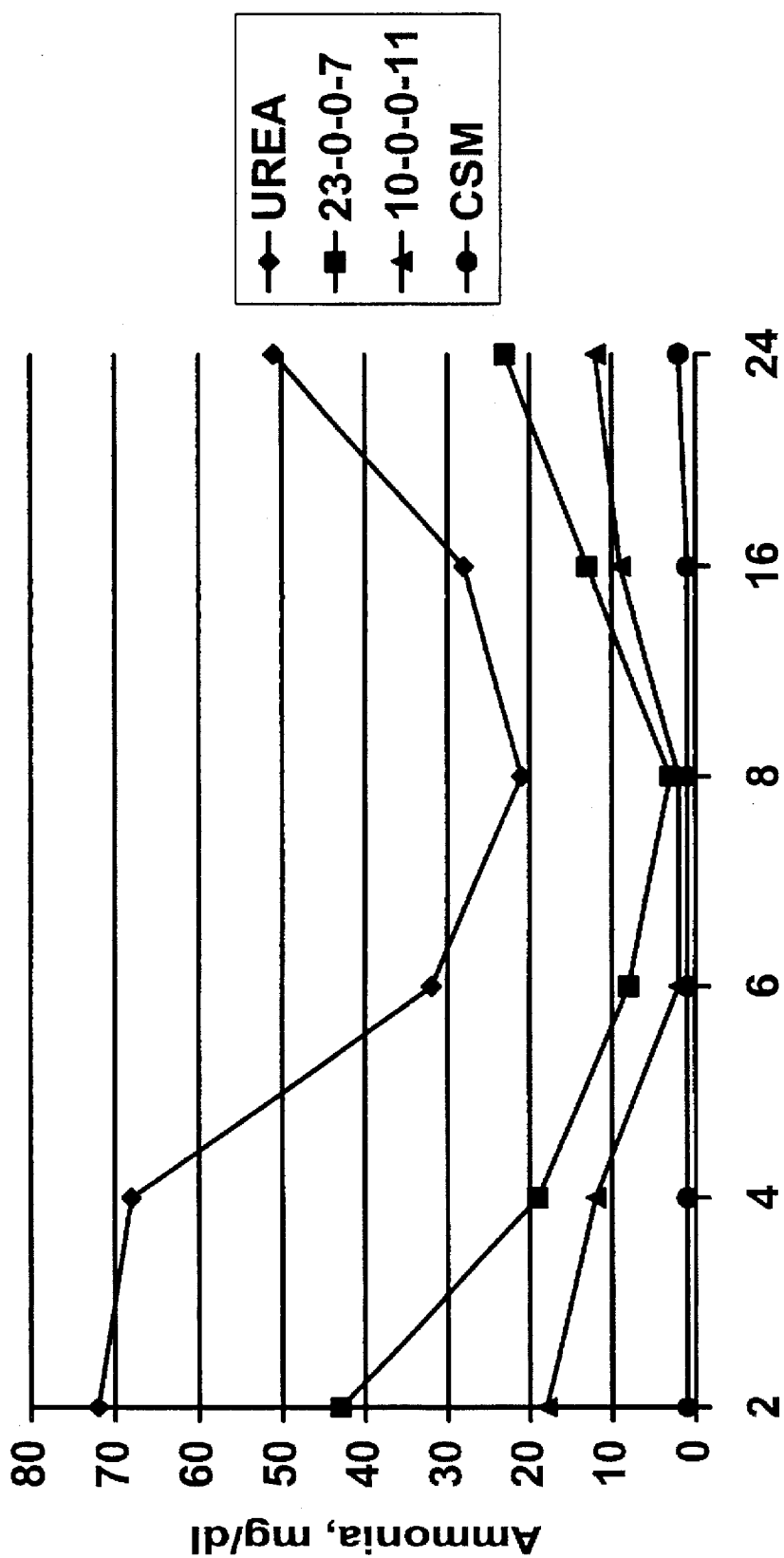
FIG. 1 is a graph of comparative in vitro digestion rates of cornstarch mixed with a preferred embodiment of the feed supplement of the present invention, having a nitrogen:calcium ratio of 3.3:1 (23-0-0-7) versus urea and cottonseed meal. (The four numbers in parentheses refer to N, P, K and Ca.)

In the case of beef cattle, feeding generally takes place in either a feedlot, where the contents of the cattle feed can be closely controlled, or in a pasture, where there is less control over the animal's diet. In the feed lot environment, the operator must balance the amount of protein, roughage, carbohydrates, minerals and vitamins in the feed to maximize yield per unit cost. The source and amount of each component of the cattle feed depends upon a number of factors including the price and quality of each component. Thus, in maximizing return, the operator must consider the cost of various grains, sources of roughage, the purchase price of the animals and the sale price of the animals at different weight levels.

Normally, in feed lot operations, the animals consume more concentrated feed, including higher quality carbohydrate sources and a higher concentration of urea in the feed. A higher concentration of urea may be used in feedlot operations without risk of ammonia toxicity because of the greater control over the animals' diet. The use of higher quality carbohydrate sources appears to enable the animals to utilize ammonia released from urea faster, rendering them less susceptible to ammonia toxicity.

In a typical feedlot, the basic feed may consist of corn, sorghum or other grains, silage or hay, cotton burs, hulls or other roughage. The basic feed will typically contain between 8% and 9.5% natural protein. For a growing ration, an operator will typically want from 12% to 14% protein; for a fattening or finishing ration, the operator will normally want between 11% to 12% protein to allow more carbohydrates in the animals' diet. Consequently, during typical feedlot operations, the operator will want to increase the protein content of the basic feed mix by 3% to 6% for optimum results. Thus, the basic feed would be supplemented with as much urea as possible without risking urea toxicity and cottonseed meal or another high-protein source would be used to make up the difference.

When cattle are on pasture, most of the feed intake generally comes from grazing. However, supplement feeding, in the form of either a liquid or solid may be desirable. In a lick feeder, a liquid supplement is available to the animals by lick rotating wheels; solid feed is generally make available to the animals in troughs or other conventional feeders. Supplemental feed may also be made available in the form of dry blocks, which are generally based upon molasses which is dried after formulation of the supplement. The blocks are set out for the animals to lick. The feed supplement of the present invention may be used in all of the above applications. In particular, the feed supplement of the present invention may be used in the formulation of dry blocks as a non-protein source of nitrogen. In the past, urea has not been a viable source of nitrogen in dry blocks as the urea would break down rapidly, hydrolyzing to ammonia and carbon dioxide before the block would be consumed.

When cattle are on pasture, the animals will typically consume more cellulose which slows digestion and furthermore, grass tends to be relatively low in protein. Consequently, the purpose of supplemental feeding when the animals are on pasture is generally to provide additional carbohydrates to compensate for the higher cellulose intake and to provide an additional source of protein. Molasses and/or steep water (water in which corn has been soaked and which contains the soluble fractions of the corn) are generally used to provide the carbohydrate component.

One problem incurred in supplemental feeding when cattle are on pasture is over-consumption of the supplement. Preferably, the supplemental feed is palatable, so that the animals will consume the feed to obtain the supplement to the extent desired. Usually the supplemental feed contains molasses which is well liked by the animals. On the other hand, the supplemental feed should not be so attractive to the animals that they will over-consume the supplemental feed at the expense of normal grazing or to the extent that a few animals consume all of the supplemental feed at the expense of the rest of the herd. Consequently, in order to prevent over-consumption, a restrictor, such as excessive salt, is added to the supplemental feed. Although not ideal, such a restrictor provides the animals with an incentive to limit their intake of the supplemental feed.

The present invention provides a feed supplement that overcomes the limitations of the prior art and more particularly, permits the use of a higher percentage of urea in ruminant feed. The use of the feed supplement of the present invention permits the use of urea as a non-protein source of nitrogen at levels up to about 2% of the total dry matter weight of the feed.

The feed supplement of the present invention is typically produced by mixing a stock solution of 38% by weight calcium chloride with dry urea. Urea as manufactured generally contains 46% nitrogen. The ratio of nitrogen to calcium in the finished supplement may range from about 2.5:1 to about 4:1. More preferably, the feed supplement has a nitrogen:calcium ratio of from about 3:1 to about 3.5:1. Most preferably, the feed supplement has a nitrogen:calcium ratio of approximately 3.3:1. In the preferred embodiment of the invention, the feed supplement of the present invention has an ammonia release rate that is less than 50% of the ammonia release rate of feed grade urea as measured by in vitro testing. The resulting feed supplement is stable and can be stored at ambient temperatures as low as −70° F. without salting out. This is in contrast to normal urea solutions, which require heating and special handling to avoid precipitation at lower temperatures.

Figure 7A:
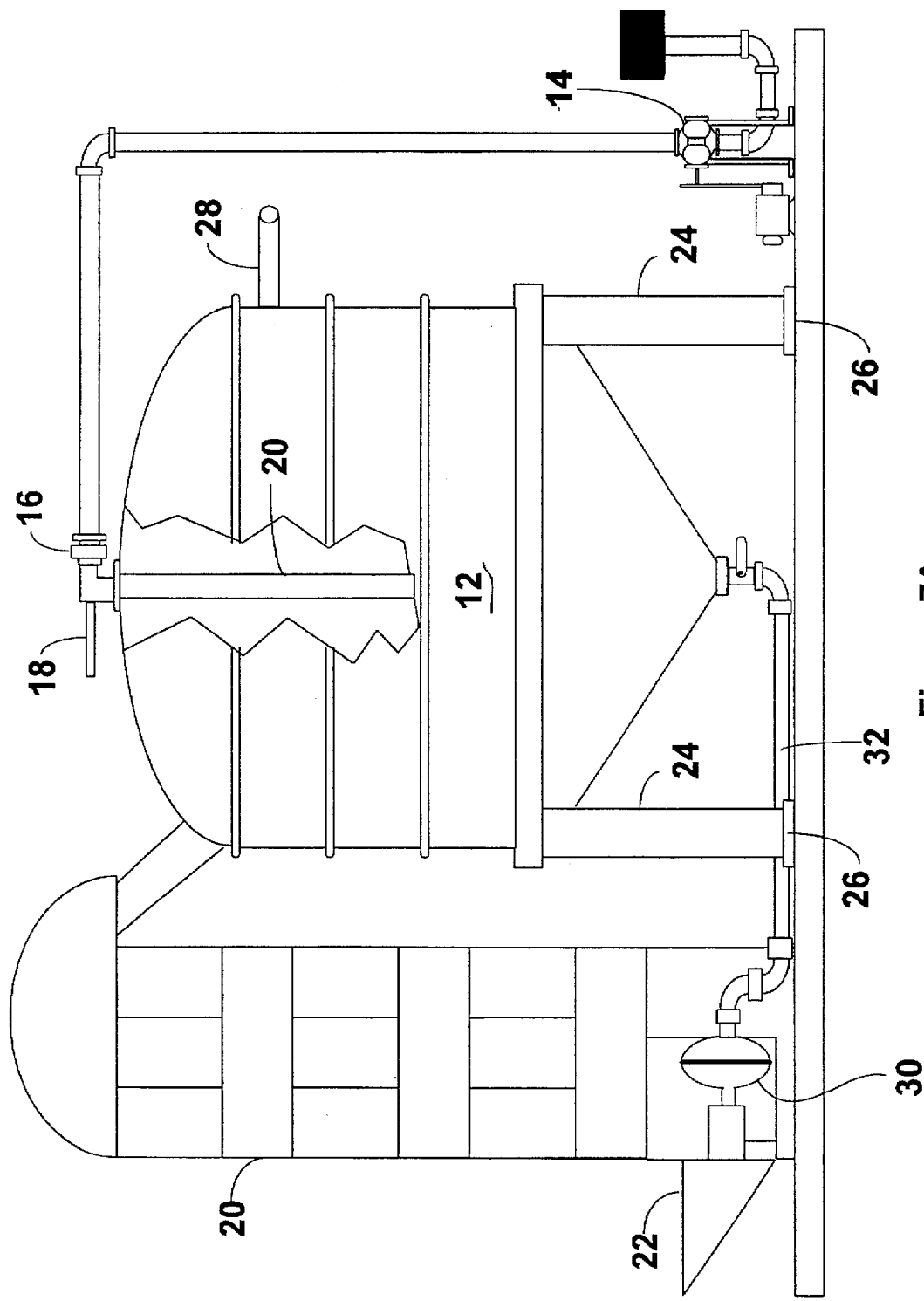
FIGS. 7a and 7b illustrate the mixing equipment used to prepare the feed supplement of the present invention.

Referring now to FIG. 7A a mixing apparatus for the preparation of the feed supplement of the present invention is illustrated. A combustion air blower 14 supplies combustion air to a burner 16 where a fuel gas such as natural gas, supplied through line 18 is mixed with combustion air and burned. The combustion products, i.e. a hot gas containing carbon dioxide, water vapor and nitrogen are injected into the solution contained in the mixing vessel 12 through line 20. The hot gas may also contain small amounts of carbon monoxide, oxygen and uncombusted hydrocarbons depending upon feed rate of the fuel gas and combustion air, the efficiency of the burner 16 and the combustion conditions. Although the process as disclosed utilizes a gas burner as a source of hot gas for heating and agitating the formulation, it is contemplated that another source of hot gas, such as high pressure steam could be used for the same purpose.

A bucket elevator 20, equipped with hopper 22, is used to load dry urea into the mixing vessel 12. The mixing vessel 12 is supported on legs 24 which rest upon load cells or scales 26 to provide a means of measuring the amount of raw materials added to the vessel 12. Calcium chloride solution is injected into the mixing vessel through line 28 which may be connected to the vessel at various locations. A liquid pump 30 is utilized to pump the finished product from the mixing tank 12.

Figure 7B:
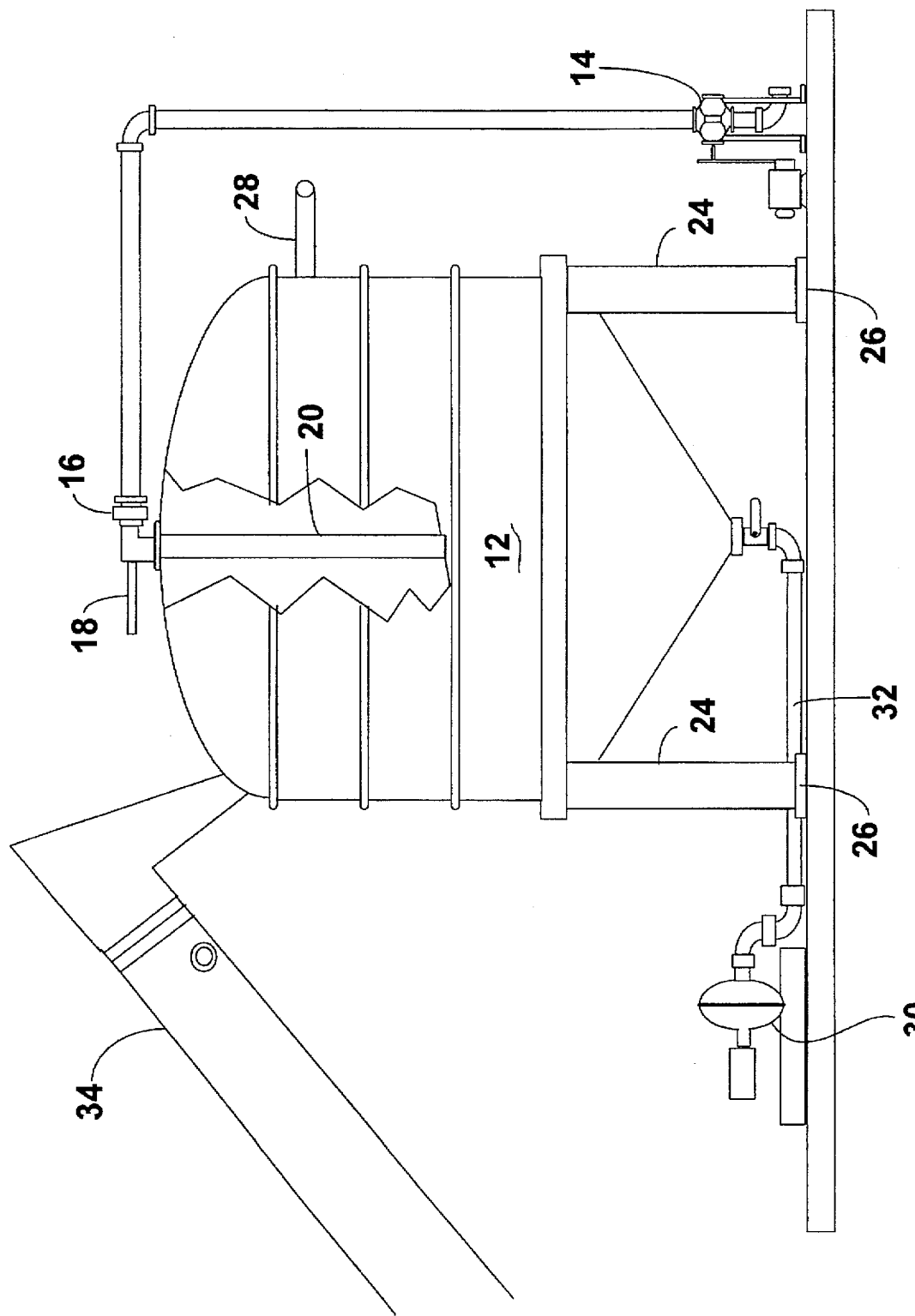

FIG. 7B illustrates a mixing apparatus similar in all material respects to that shown in FIG. 7A, except a belt elevator 34 is used to load the dry urea into the vessel 12.

EXAMPLE I

The feed supplement of the present invention is prepared by introducing 10,000 pounds of 38% calcium chloride solution into the mixing vessel. The gas burner is activated and the solution heated to a temperature of approximately 80° F. Once the solution reaches a temperature of about 80° F., 10,000 pounds of dry urea (46 wt % urea) is added to the solution. Since dissolving urea is an endothermic process, the temperature of the solution rapidly drops to approximately 30° F. The gas burner is used to heat and agitate the solution until it reaches a temperature between about 45° F to 50° F. Preferably, the temperature of the solution does not exceed 50° F. in order to avoid undesirable side effects, such as lowering the pH. Preferably, the pH of the finished product is in the range of from about 7.0 to about 8.0. For 20,000 of finished product, the time need to complete the heating and agitation of the solution will vary with the ambient temperature, but will typically range from between 10 and 20 minutes depending upon the ambient temperature and the capacity of the gas burner.

A feed supplement prepared in accordance with the above procedure was analyzed using infrared Spectroscopy and the results are set forth in Table 1 below. The table below shows infrared band positions in $cm^{-1}$ with proposed vibrational assignments. Key: w=weak, m=medium, s=strong; underlined peaks for the new feed are not found in pure urea or have significantly changed intensities; a=different bands that overlap into one observed peak.

TABLE 1

| Assignment | Urea/Calcium | Pure Urea |
| --- | --- | --- |
| symmetric N—H stretch | 3428s[a] | 3342s |
| asymmetric N—H stretch | 3428s[a] | 3441s |
| carbonyl C=P stretch | 1625s[a] | 1684s |
| N—H bending vibration | 1625s[a] | 1625s |
| C—N stretching vibration | 1472s | 1466s |
|  | 1402s |  |
|  | 1326m |  |
| other molecular vibrations | 1161m | 1154m |
|  | 1067w | 1061w |
|  | 979w | 997w |
|  | 903w |  |
|  | 826m |  |
|  | 791m | 788w |
|  | 709w | 714w |
|  | 585w |  |
|  | 561m | 559m |

Elemental analysis results show that the solid obtained by evaporation of the feed supplement of the present invention is a mixture of substances which fits the empirical formula $CaC_6H_{19}N_9Cl_3O_8$ reasonably well. Observed percentages for Ca, C, H and O fit the proposed formula well, while small deviations may be noted in the cases of N and Cl. Since pure urea has the formula $CH_4N_2O$ it is clear that the empirical formula of the feed supplement does not contain a simple integer multiple of urea molecules. This result is underscored by percentages calculated for the literature $Ca(urea)_4Cl_2$ compound, which differ greatly from the composition of the feed supplement. It can be concluded that the organic content of the feed supplement is similar to that in urea, but components other that urea clearly are present. Notably, the C:N ration of urea is 1:2, while that in the feed supplement solid is reduced to 1:1.5 (6:9). This suggests that a partial loss of nitrogen from urea occurs during the preparation of the product. The supplement also contains much more oxygen than the literature $CaC_4H_{16}N_8Cl_2O_4$ compound. It seems reasonable to conclude that this additional oxygen originates from water used as the solvent. The extra oxygen is not associated with sample wetness, as the solid was dried thoroughly and elemental analysis does not show a dramatic increase in hydrogen content. Additionally, the Ca:Cl ratio is 1:3 rather than the 1:2 ratio expected from the $CaCl_2$ starting material. This indicates a modification of the organic content that brings about an increase of +1 unit in electric charge, since calcium exists in nature only as +2 cations. While it is not clear how this increase occurs, it may be concluded that the compound cannot be composed entirely of $Ca^{2+}$ cations, $Cl^-$ anions and neutral urea molecules. It is believed that urea nitrogen is partially converted to amine functional groups which become protonated to —$HN_3^+$ charged units.

The known compound $Ca(urea)_4Cl_2 \rightarrow Ca^{2+} + 4$ urea + 2 $Cl^-$. In this way, one molecular formula unit would give a total of seven product species in solution. Osmotic pressure measurements indicate that the feed supplement of the present invention also dissociates into seven distinct product particles, even though urea is not the only organic component. Considering the Ca:Cl ration, it may be concluded that the dissociation of the supplement occurs as follows:

One formula unit of the supplement→$Ca^{2+}$+3 $Cl^-$+3 organic fragments. While it may be that the formulas of the three organic fragments add up to $C_6H_{19}N_9O_8$, there is no evidence to specify their exact molecular compositions.

The infrared spectra of the feed supplement of the present invention and pure urea ($H_2NCONH_2$) indicating that the organic content of the product is distinctly different from $H_2NCOHN_2$. There is very little difference in the N—H and C=O stretching vibrations, showing that N—H and C=O bonds are present in both materials. Urea shows only a single C—N stretching vibration at 1466 $cm^{-1}$ while the feed supplement exhibits a complex series of six peaks (3 major bands) in this region. It appears likely that new types of C—N bonds exist in the product and it is believed that the condensation of urea molecules occurs to give products in which one or both nitrogen atoms of a particular urea molecule attack the carbonyl carbon atoms of other urea molecules. While the makeup of these condensation products is not known the infrared evidence provides indicates that organic molecules other than urea are present especially the low energy region between 500 and 1000 $cm^{-1}$ [1] where new peaks at 826 and 585 $cm^{-1}$ are observed along with a weaker new feature at 903 $cm^{-1}$ [1], and a dramatic strengthening of the 791 $cm^{-1}$ band relative to the analogous 788 $cm^{-1}$ feature of pure urea. It is believed that the presence of new organic molecules (possibly an aggregate or oligomer), as demonstrated above, accounts for the slow release feature which is a key attribute of the innovative feed supplement.

EXAMPLE 2

A study of the digestibility of the feed supplement of the present invention was conducted in order to provide a comparison to the digestibility of urea and cotton-seed meal in an experiment designed to determine ammonia release rate over time. A formulation of the feed supplement of the present invention was tested, consisting of an aqueous solution of the feed supplement of the present invention formulated as described above to provide a supplement having a nitrogen:calcium ratio of approximately 3.3:1 (23-0-0-7 N, P, K, and Ca, respectively).

In this experiment, in vitro substrates were formulated using cornstarch. Nitrogen, not supplied by ground corn or corn starch, was supplied by feed grade urea and a urea/calcium feed supplement of the present invention having a nitrogen:calcium ratio of approximately 3.3:1. The different nitrogen sources were added at levels to achieve 14% isonitrogenous crude protein fermentation media. The test materials and conditions were designed in an attempt to simulate the environment in the rumen. One hundred grams of each medium were prepared in which each nitrogen source was weighed and then raised to 25 g with distilled water. This procedure was to ensure similar mixing because of the fact that some nitrogen sources were already in a liquid form. A small stand mixer was used to mix the diets as the liquid was evenly applied by a hand spray bottle. Each respective medium was weighed into 5 gram portions, placed into incubation flasks, and digested by the procedure described by Dinus et al. (1974) A solution containing 30% rumen fluid, strained through cheesecloth and 70% McDougal's buffer, without N, was added to all incubation flasks. The incubation flasks were flushed with $CO_2$ and capped to create an anaerobic atmosphere. The flasks were maintained at 39° C. Samples taken at two hour intervals and analyzed for ammonia content by a colorimetric procedure. A Beckman DU-50 Spectrophotometer was used in reading samples in this procedure. The individual test results were averaged and the values set forth in Table 2 below. Also set forth below are the calculated ratios of the ammonia release rates for the supplement of the present invention vs. urea.

TABLE 2

| | AMMONIA RELEASE UTILIZING 14% CORNSTARCH (mg/dl) | | |
|---|---|---|---|
| Hour | Urea | Urea/Calcium Chloride Supplement | Release Ratio |
| 2 | 73.0 | 43.2 | 0.58 |
| 4 | 67.1 | 18.3 | 0.27 |
| 6 | 32.2 | 7.9 | 0.25 |
| 8 | 21.0 | 1.3 | 0.60 |
| 16 | 27.7 | 12.6 | 0.80 |
| 24 | 51.0 | 24.4 | 0.48 |

FIG 1 shows the results from one of these studies, where 14% cornstarch was the incubation media. Here, the ammonia concentration found in the media is charted for each of the four protein sources over time. It can be clearly seen from this graph that the feed supplement of the present invention has a much lower rate of ammonia release, less than 60%, at any time during the first six hours of anaerobic digestion or fermentation than does urea alone as measured in a 14% crude protein/cornstarch incubation media. In fact the average ratio of ammonia release for the supplement of the present invention vs. urea is 36.7 during the first six hours of fermentation. Thus, the supplement of the present invention provides a slow release, non-protein source of nitrogen that releases ammonia at an average rate less than 40% of the rate that urea releases nitrogen in a comparable in vitro test during the first six hours of fermentation. The term "comparable in vitro test" as used herein refers to a test conducted substantially in accordance with the procedure set forth above.

COMPARATIVE EXAMPLE 3

Figure 6:
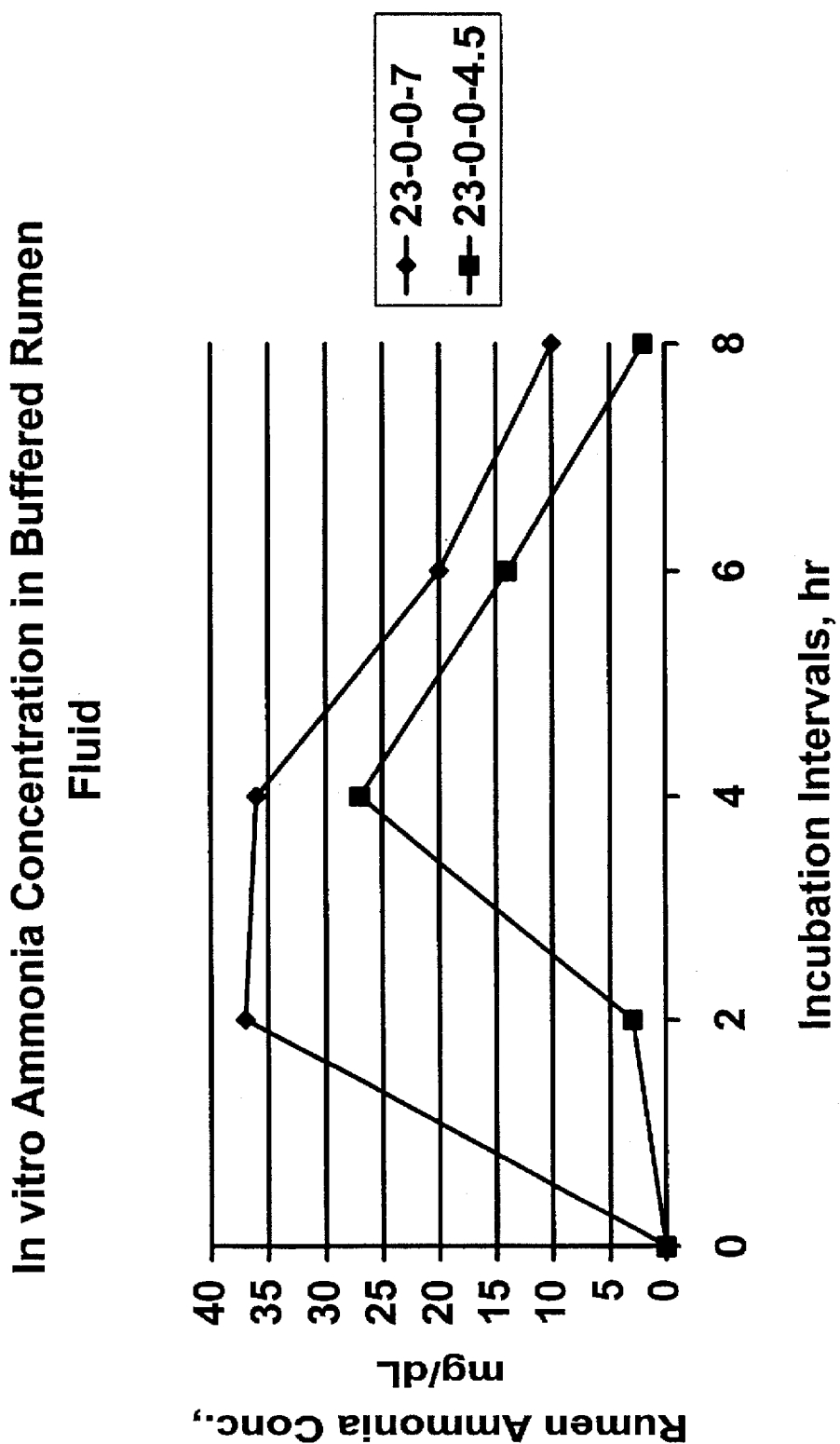
FIG. 6 is a graph of comparative in vitro digestion rates of cornstarch mixed with a preferred embodiment of the feed supplement of the present invention, having a nitrogen:calcium ratio of 3.3:1 versus a prior art solution having a nitrogen:calcium ratio of 5.1:1.

A solution similar to that disclosed in Kail, U.S. Pat. No. 3,532,798 was prepared from 32.8% of a 38% calcium chloride solution, 17.2% water and 50% commercial urea (46% urea). The 38% calcium chloride solution was first mixed with the water and heated to approximately 120° F. in a pan. The urea was then dissolved in the calcium chloride solution to produce a solution containing 23% nitrogen and 4.5% calcium (23-0-0-4.5) (nitrogen:calcium ratio of 5.1:1). The solution was tested for ammonia release as described in Example 2, above along with a feed supplement of the present invention (23-0-0-7). The ratio of the release rates for the 23-0-0-4.5 product versus urea were calculated based upon the corresponding urea release values from Table 2 and set forth below. The results of the test are set forth in Table 3 below and graphically illustrated in FIG. 6.

TABLE 3

| | AMMONIA RELEASE UTILIZING 14% CORNSTARCH (mg/dl) | |
|---|---|---|
| Hour | 23-0-0-4.5 | 23-0-0-7 |
| 2 | 36.21 | 30.77 |
| 4 | 34.42 | 27.01 |
| 6 | 19.61 | 13.28 |
| 8 | 1.49 | 9.46 |

As can be seen from the foregoing, the feed supplement of the present invention releases ammonia at a rate substantially lower than the 23-0-0-4.5 material during the first six hours of fermentation.

COMPARATIVE EXAMPLE 4

A solution similar to that disclosed in Kail, U.S. Pat. No. 3,532,798 was prepared from 32.8% of a 38% calcium chloride solution, 17.2% water and 50% commercial urea as set forth in Comparative Example 3. A sample of the material was refrigerated to determine the temperature at which solids could be observed precipitating ("salting out") of the solution. As the temperature of the mixture was lowered, solids were observed precipitating from the mixture at approximately 4° F.

A preferred embodiment of the feed supplement of the present invention was prepared by mixing 50% by weight of a 38% calcium chloride solution with 50% by weight of a commercial grade urea (46% urea) in accordance with the procedure set forth in Example 1. An alcohol bath was positioned in a container of dry ice in other to test the material. The mixture was tested for its salt out temperature by lowering the temperature of a sample of the material in a test container placed in an alcohol bath. The temperature of the material was monitored and the material was visually inspected for the formation of solids. Surprisingly, no solids were observed precipitating from the material above −70° F. When the material reached −70° F. the material formed a gel-like mass.

The foregoing example illustrates a highly advantageous property of the feed supplements of the present invention. That is, the feed supplements of the present invention can be handled and shipped at low temperatures without the need for special equipment. This property is particularly advantageous during the winter months when extreme temperatures may be encountered in many areas where feedlots are located such as the midwest.

EXAMPLE 5

A study was carried out to evaluate the relative feeding value of the feed supplement of the present invention on feedlot performance, carcass grade and yield as compared to feed grade urea and cottonseed meal. Seventy-five steers were divided into 9 pens of approximately 8 animals each. Each pen was assigned to one of three feeding groups: diets were the same for each group except that the supplemental protein source was chosen to be either cottonseed meal, urea or the feed supplement of the present invention having a nitrogen:calcium ratio of 3.3:1 (23-0-0-7). Steers were weighed at six weigh periods: initial weight, 28, 56, 108, 132 and 147 days. All steers were then killed and weighed at a commercial packing plant and carcass data was collected.

Figure 2:
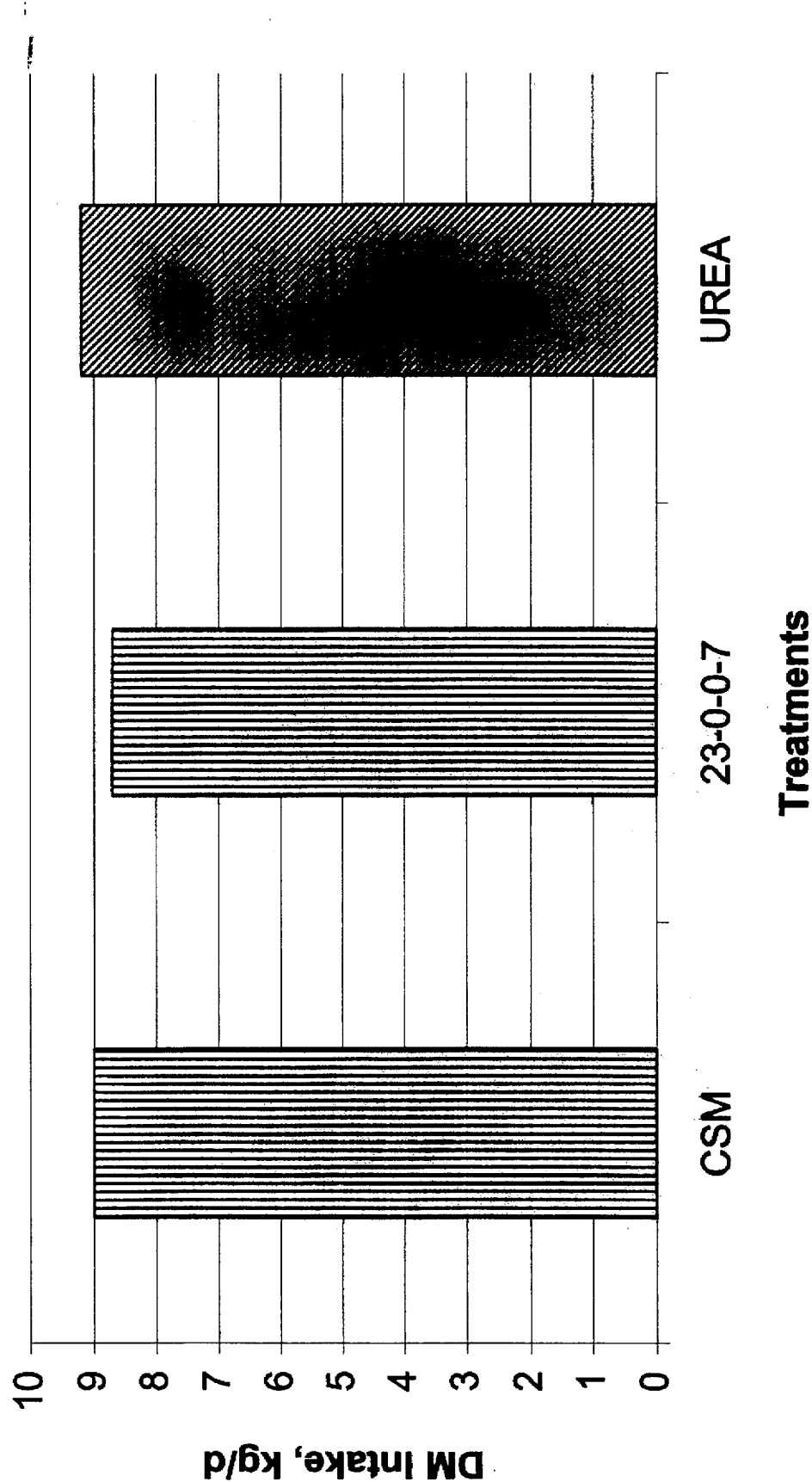
FIG. 2 is a bar graph of the dry matter intake of feedlot steer consuming diets containing one of the following as a nitrogen source: cottonseed meal, the feed supplement of the present invention (23-0-0-7), or feed grade urea.

FIG. 2 shows a bar graph of the dry matter intake of feedlot steers consuming diets containing one of the following as a nitrogen source: cottonseed meal, a feed supplement of the present invention having a nitrogen:calcium ratio of 3.3:1, (23-0-0-7), or feed grade urea. As can be seen, the dry matter intake for the feed containing the feed supplement of the present invention is slightly reduced, as compared to cottonseed meal or urea.

Figure 3:
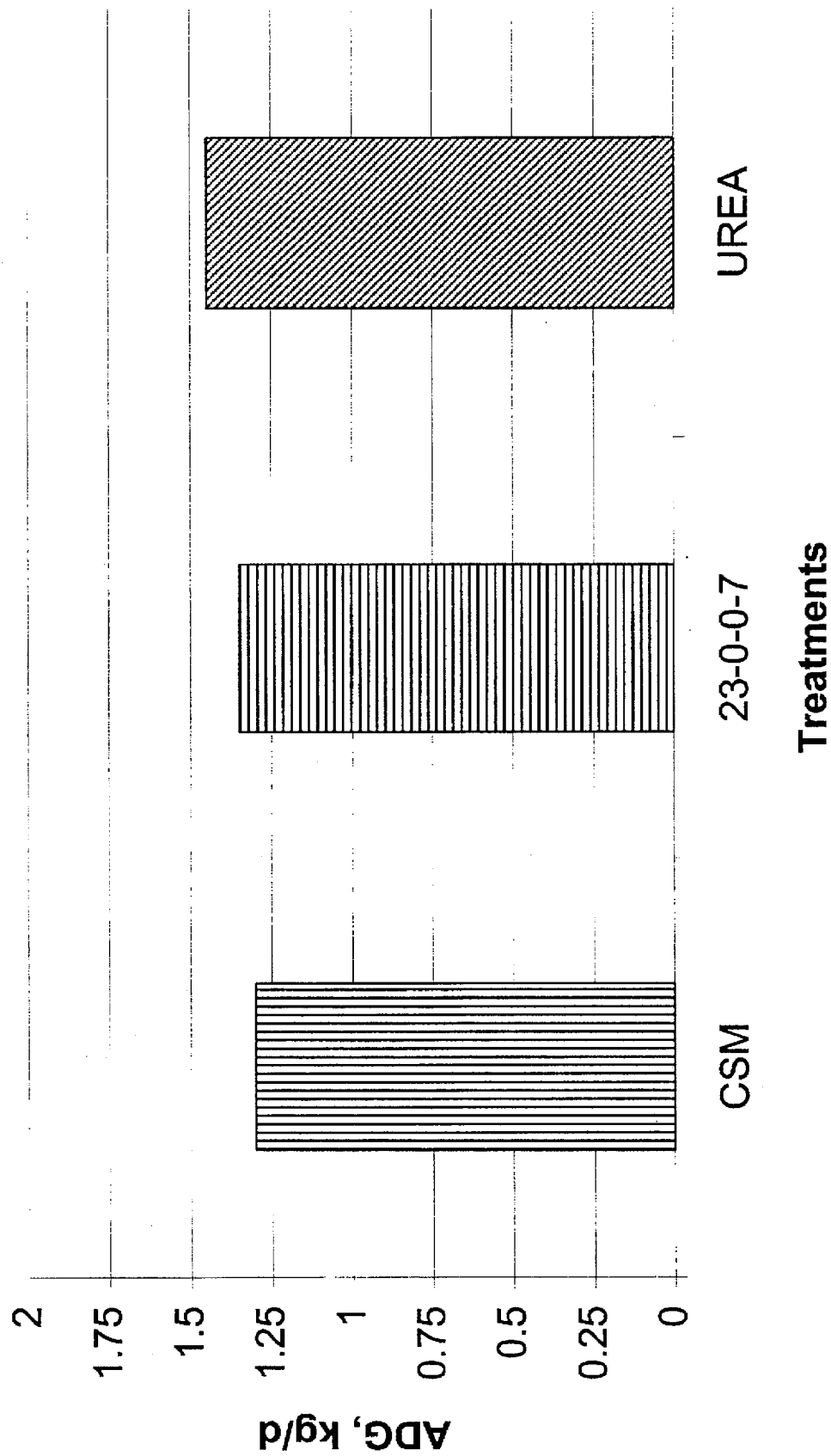
FIG. 3 shows a bar graph of the average daily gain of feedlot steers consuming diets containing one of the following as a nitrogen source: cottonseed meal, the feed supplement of the present invention (23-0-0-7), or feed grade urea.

FIG. 3 shows the average daily gain of feedlot steers consuming the same diets as above. Here, the use of the supplement resulted in an average daily gain between that of cottonseed meal and urea.

Figure 4:
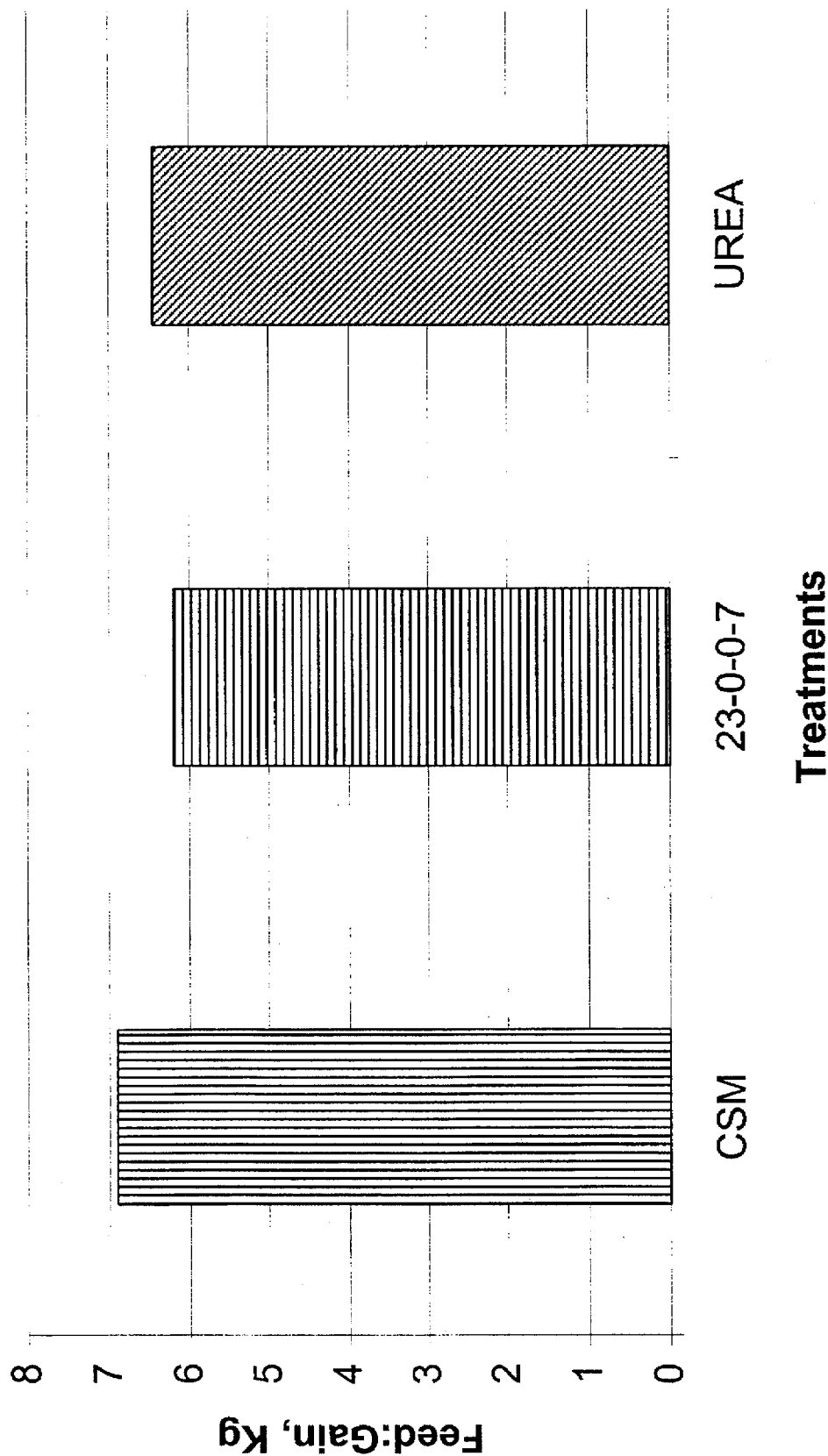
FIG. 4 shows a bar graph of the feed(kg) required to attain 1 kg of gain by steers fed diets containing one of the following as a nitrogen source: cottonseed meal, the feed supplement of the present invention (23-0-07), or feed grade urea.

FIG. 4 shows the feed(kg) required to attain 1 kg of gain by steers when fed the test diets. The feed supplement of the present invention required the least amount of feed to cause a specified weight gain.

Figure 5:
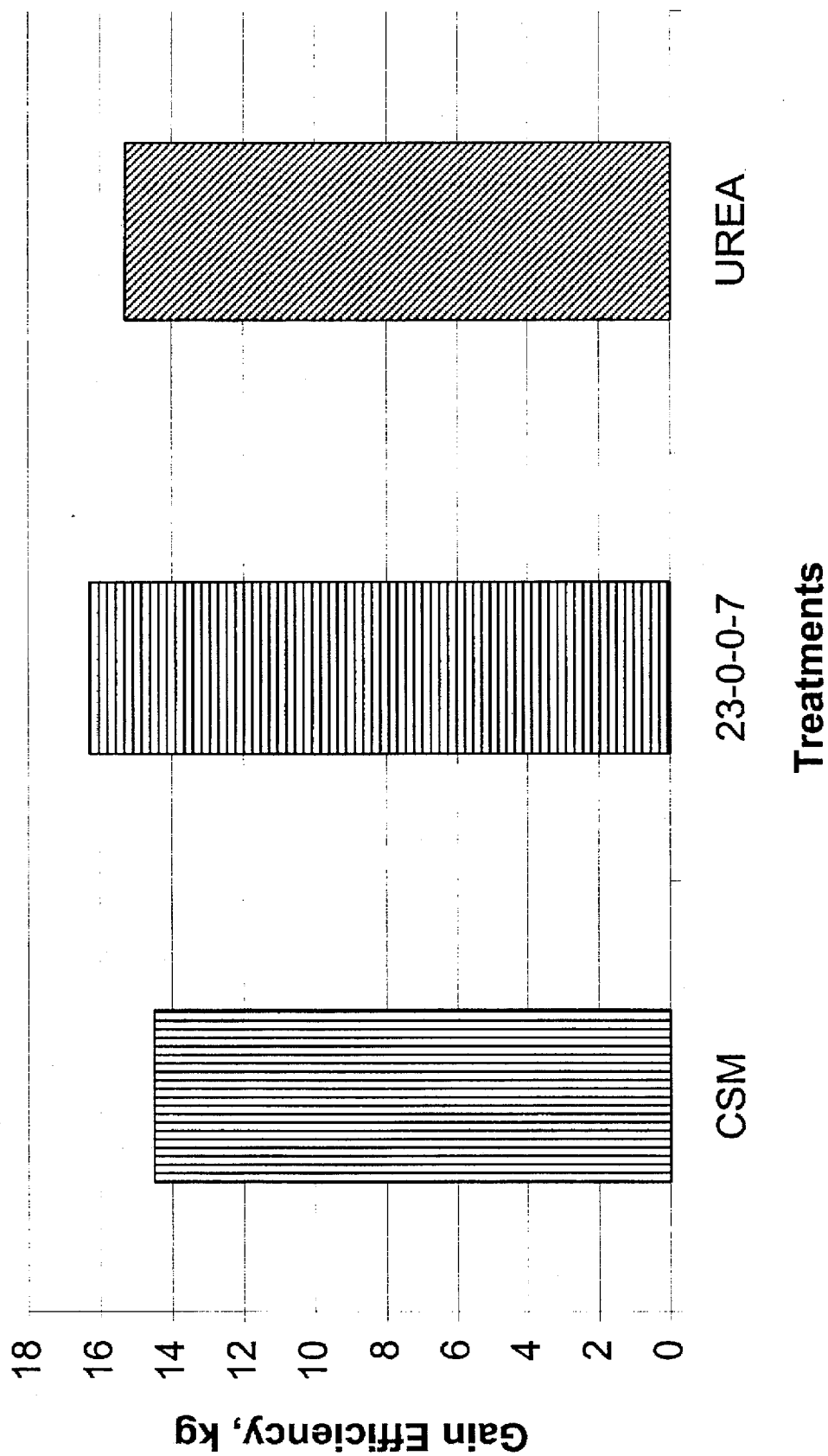
FIG. 5 shows a bar graph of the gain(kg) for every 100 pounds of feed ingested by steers fed diets containing one of the following as a nitrogen source: cottonseed meal, the feed supplement of the present invention (23-0-0-7), or feed grade urea.

FIG. 5 shows the gain efficiency for the selected supplements. The feed supplement of the present invention shows the greatest gain efficiency of the supplements tested.

The foregoing Example illustrates the usefulness of the feed supplement of the present invention in the preparation and use of feedlot rations.

The results of the above test were reported in a thesis entitled "Urea:Calcium Compounds as a Supplement Source of N and Ca for Ruminants" by John L. Cass, Texas Tech University, December 1994, the disclosure of which is incorporated herein for all purposes.

Although the invention has been illustrated in the accompanying Drawings and described in the foregoing Detailed Description, it will be understood that the invention is not limited to the embodiments disclosed but as will be appreciated by those skilled in the art, but rather, the invention is susceptible to numerous modifications and variations without departing from the spirit and scope of the invention as hereinafter claimed.

I claim:

1. A feed supplement for ruminants, comprising:
   an aqueous mixture formed by reacting urea and calcium chloride in solution, the supplement having a nitrogen:calcium ratio of between 2.5:1 to 4.0:1 and a salt out temperature between −40° F. and −70° F.;
   wherein said compound provides for slow-release of ammonia during anaerobic digestion.

2. The feed supplement of claim 1, wherein solid urea is reacted with a 38% aqueous solution of calcium chloride to produce the feed supplement.

3. The feed supplement of claim 1, wherein the feed supplement releases ammonia at average rate of less than 40% of the average rate that urea releases ammonia during the first six hours of comparable in vitro testing.

4. The feed supplement of claim 1, wherein the ratio of nitrogen:calcium ratio in the supplement is between 3.0:1 and 3.5:1.

5. The feed supplement of claim 1, wherein the nitrogen:calcium ratio in the supplement is approximately 3.3:1.

6. A feed supplement for ruminants, comprising:
   an aqueous mixture formed by reacting urea and calcium chloride in solution, the supplement having a nitrogen:calcium ratio of approximately 3.3:1, the supplement exhibiting no salt out at temperatures between −60° F. and −70° F.;
   wherein said compound provides for slow release of ammonia during anaerobic digestion.

7. The feed supplement of claim 6, wherein solid urea is reacted with a 38% aqueous solution of calcium chloride to produce the feed supplement.

8. The feed supplement of claim 6, wherein the feed supplement is produced by a process including the steps of:
   (1) providing an aqueous solution of calcium chloride at a temperature of between 70° F. and 100° F.;
   (2) dissolving solid feed grade urea in the aqueous calcium chloride solution; and
   (3) heating and agitating the mixture by direct injection of a heated gas or steam until the temperature of the solution reaches between about 45° F. and about 50° F.

9. A process for the production of a slow-release non-protein ruminant feed supplement comprising the steps of:

(1) providing an aqueous solution of calcium chloride at a temperature of between 70° F. and 100° F.; (2) dissolving solid feed grade urea in the aqueous calcium chloride solution; and (3) heating and agitating the mixture by direct injection of a heated gas or steam until the temperature of the solution reaches between about 45° F. and about 50° F.;

the feed supplement having a nitrogen:calcium ratio of between 2.5:1 to 4.0:1 and a salt out temperature between −40° F. and −70° F.;

the feed supplement being characterized by slow release of ammonia during anaerobic digestion.

10. The process of claim 9, wherein solid urea is reacted with a 38% aqueous solution of calcium chloride to produce the feed supplement.

11. The process of claim 9, wherein the feed supplement releases ammonia at average rate of less than 40% of the average rate that urea releases ammonia during the first six hours of comparable in vitro testing.

12. The process of claim 9, wherein the ratio of nitrogen::calcium ratio in the supplement is between 3.0:1 and 3.5:1.

13. The process of claim 9, wherein the nitrogen:calcium ratio in the supplement is approximately 3.3:1.

* * * * *